United States Patent [19]
Mårtensson

[11] Patent Number: 6,101,778
[45] Date of Patent: *Aug. 15, 2000

[54] FLOORING PANEL OR WALL PANEL AND USE THEREOF

[75] Inventor: Göran Mårtensson, Klagstorp, Sweden

[73] Assignee: Perstorp Flooring AB, Trelleborg, Sweden

[ * ] Notice: This patent issued on a continued prosecution application filed under 37 CFR 1.53(d), and is subject to the twenty year patent term provisions of 35 U.S.C. 154(a)(2).

[21] Appl. No.: 08/894,966

[22] PCT Filed: Feb. 29, 1996

[86] PCT No.: PCT/SE96/00256

§ 371 Date: Aug. 28, 1997

§ 102(e) Date: Aug. 28, 1997

[87] PCT Pub. No.: WO96/27721

PCT Pub. Date: Sep. 12, 1996

[30] Foreign Application Priority Data

Mar. 7, 1995 [SE] Sweden ................................. 9500810

[51] Int. Cl.[7] ...................................................... E04B 1/38
[52] U.S. Cl. ......................... 52/582.1; 52/591.1; 52/592.1
[58] Field of Search .............................. 52/582.1, 586.1, 52/591.1, 591.3, 591.4, 592.1, 592.2

[56] References Cited

U.S. PATENT DOCUMENTS 5,216,861   6/1993   Meyerson .
5,295,341   3/1994   Kajiwara .

FOREIGN PATENT DOCUMENTS 1430423   3/1976   United Kingdom .
2256023   11/1992   United Kingdom .

*Primary Examiner*—Carl D. Friedman
*Assistant Examiner*—Kevin D. Wilkens
*Attorney, Agent, or Firm*—Stevens, Davis, Miller & Mosher, L.L.P.

[57] ABSTRACT

Flooring panel or wall panel and a use thereof in a wet room. The panel is provided with a locking means in the form of groove (6) and tongue (7) forming a tongue/groove joint for assembling of the panels. The groove (6) and the tongue (7) are made of water tight material and formed with a snap-together joint.

16 Claims, 1 Drawing Sheet

FLOORING PANEL OR WALL PANEL AND USE THEREOF

BACKGROUND OF THE INVENTION

1. Field of the Invention

The present invention relates to a flooring panel or wall panel and the use thereof in a wet room.

2. Description of the Prior Art

During the last few years laminated floors have achieved and increased popularity and on many markets they are beginning to replace parquet floors and wall-to-wall carpets. At the production of laminated floors a decorative thermo-setting laminate is first produced. This laminate usually consists of a base layer of paper sheets impregnated with phenol-formaldehyde resin and a decorative surface layer consisting of a decor paper sheet impregnated with melamine-formaldehyde resin. The laminate is produced by pressing the different layers at a high pressure and an increased temperature.

The laminate obtained is then glued to a carrier of particle board for instance or used as such without any carrier and it is then called compact laminate. The laminated panel thus produced is then sawn up to a number of floor boards which are provided with groove and tongue at the long sides and the short sides. Often the floor boards produced have a thickness of about 7 mm, a length of 120 cm and a width of about 20 cm. Thereby they can usually be put on top of an existing flooring material at a renovation. According to another alternative, instead one or more of the above decorative sheets can be laminated directly towards a base sheet of particle board for instance.

At the assemblage of such a flooring glue is normally applied in the groove when the floor boards are assembled. Therefore, it will be difficult to change a damaged board or to remove a whole flooring and for instance install it in another room.

To avoid the above problem efforts have been made to achieve floor boards which can be assembled without glue. One such construction is disclosed in the U.S. Pat. No. 5,295,341. There the boards are provided with groove and tongue in the usual way, but here a snap-together system is included in the groove-tongue joint.

These floor boards can be assembled without glue. However, they have the disadvantage that the joints between the boards will be flexible and not rigid. This means that if the surface below the floor boards is not completely even which is usually the case, a gap will be formed between the boards. In these gaps dirt and water can penetrate.

SUMMARY OF THE INVENTION

According to the present invention also the last mentioned problem has been solved and a flooring panel or wall panel, preferably of thermosetting laminate having two pairs of parallel side edges has been brought about. Two of these side edges are provided with a locking means in the form of a groove and the other two with a tongue fitting in the groove whereby a tongue/groove joint for assembling of the panels is formed. The groove and the tongue are made of a water tight material and formed with a snap-together joint including one or more snapping webs or the like with corresponding cooperating snapping grooves. The groove in front of the snap-together joint has an entrance opening and continues inside the snap-together joint in a stabilizing groove. The tongue is formed with a rear neck intended to fit in the entrance opening and a forwardly protruding stabilizing part situated in front of the snap-together joint and intended for a tight fit in the stabilizing groove, whereby connecting panels when assembled by the snap-together joints and the stabilizing parts in the stabilizing grooves are fixed to each other and prevented from unintentional separation while at the same time a rigid floor covering or wall covering respectively with water tight joints and without unintentional gaps between the panels is obtained.

DESCRIPTION OF THE PREFERRED EMBODIMENTS

Figure 2:
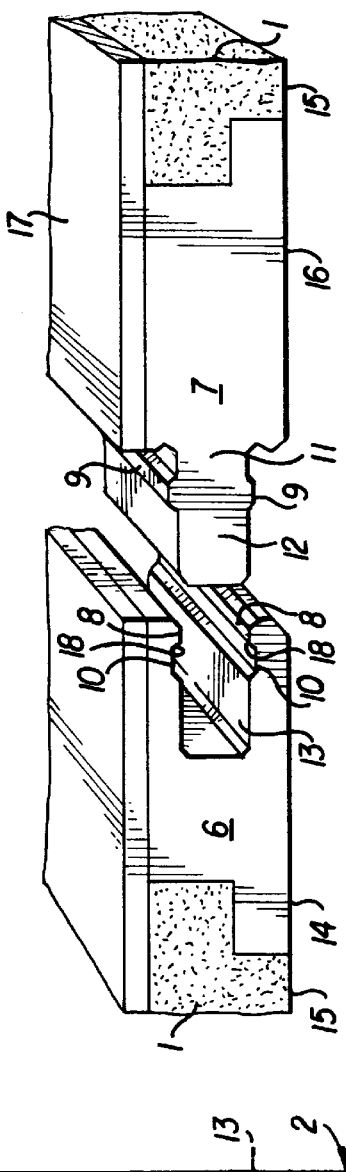
FIG. 2 shows a cross section through two adjacent edges of two panels according to the invention where the two such panels are to be assembled.

According to one preferred embodiment two adjacent side edges of the panel are provided with a groove and the other two side edges with a tongue. At this embodiment the panel is usually rectangular, but it can also be square.

At square panels it is also possible to provide a pair of parallel sides with a groove and the other pair with a tongue. However, the choice of pattern on the surface layer of the panel is limited at this shape.

It is preferred that the groove and the tongue are made of thermoplastic, a thermosetting laminate, aluminum or a chipboard or particle board impregnated with a thermoplastic. Of course also other water tight materials can be used.

At one embodiment, the groove as well as the tongue are formed as a ledge fixed to the side edges of the panel. Suitably the ledge-formed groove and tongue respectively are then fixed in a recess along the side edges with glue for instance.

The snapping webs can be formed on the upper and/or lower side of the tongue while fitting snapping grooves are formed in the groove.

In one preferred embodiment one snapping web is formed on the upper side of the tongue and one on the lower side thereof while the groove has two fitting snapping grooves one at the top and one at the bottom.

If necessary one pair of snapping webs can be formed on the upper side of the tongue and one pair on the lower side thereof. Of course you then need two snapping grooves at the top and two snapping grooves at the bottom of the groove to fit with the snapping webs. This construction will give an extremely strong joint.

Of course the snapping webs can instead be arranged in the groove and the snapping grooves on the tongue.

In one preferred embodiment the width of the stabilizing part is 2–10 mm, preferably 4–10 mm. Generally a wider stabilizing part with fitting stabilizing groove gives a better rigidity of the assembled panels.

The stabilizing part will also assist in a correct assemblage of the panels. Thus, when the stabilizing part moves into the stabilizing groove you get a correct level of the panels and the panels can easily be pushed into the correct position where you do not have any gap between the panels. Of course without any substantial gap between the panels water and dirt are prevented from entering the assembled flooring or wall covering.

As a safe guard against water penetration a seal might be arranged in the inner part of the stabilizing groove for instance.

Preferably the grooves and the tongues run the full length of the side edges of the panels.

The panels can be designed in such a manner that the under side of the groove and the tongue are situated in the same level as the under side of the panel.

The panels can be used for covering floors and walls in ordinary dry rooms. However, due to the rigid and water tight joints the panels can be used also for wet rooms. For such applications the whole panel is preferably made of thermosetting laminate of so-called compact laminate type. Such a laminate does not absorb water.

Another alternative is a non water absorbing base with a water tight surface. The surface may for instance consist of paint, a thermoplastic foil such as polyethylene, polypropylene or polyvinyl chloride, a paper sheet impregnated with thermosetting resin or of a thermosetting laminate.

One suitable non water absorbing base is a board produced by pressing wood particles or wood chips impregnated with a thermoplastic.

Figure 3:
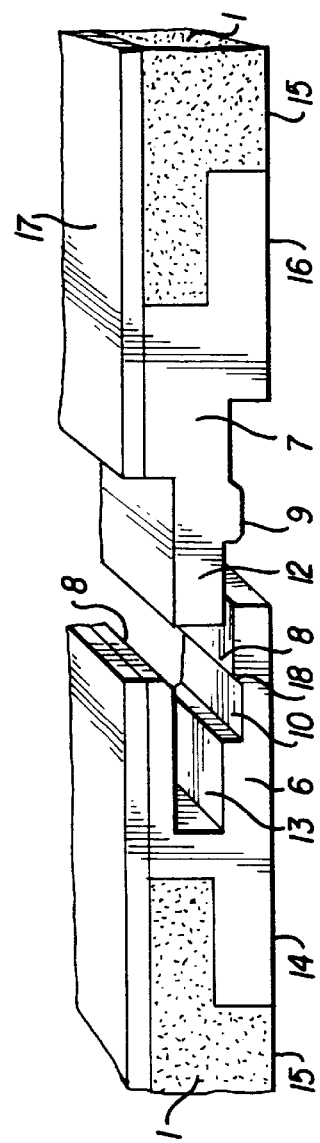
FIG. 3 shows a cross section through two adjacent edges of a second embodiment of a panel where two such panels are to be assembled.
Figure 1:
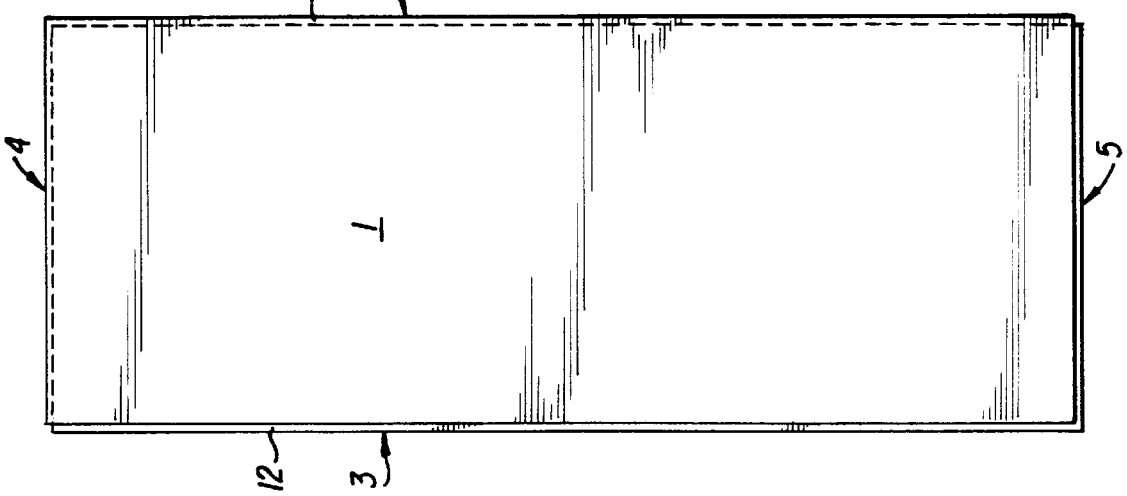
FIG. 1 schematically show a panel according to the invention seen from above.

The invention will be further explained in connection with the enclosed figures of which FIG. 1 schematically shows a panel 1 according to the invention seen from above. The panel is drawn with a rectangular shape but it can as well be square. FIGS. 2 and 3 show a cross section through two adjacent edges of two embodiments of a panel where two such panels are to be assembled. The construction according to FIG. 2 is preferred.

The panel 1 consists of a base of wood particles impregnated with a thermoplastic with a decorative thermosetting laminate as a surface layer 17 glued on top.

The panel 1 has two pairs of parallel side edges 2, 3 and 4, 5 respectively (FIG. 1). Two of these side edges are provided with locking means in the form of a groove 6 and the other two with a tongue 7 fitting in the groove 6, whereby a tongue/groove joint for assembling of the panels is formed.

The groove 6 and the tongue 7 are made of a water tight material and formed with a snap-together joint. In the embodiment shown in FIG. 2 the snap-together joint consists of two snapping webs 9, one on the upper side of the tongue 7 and one on the lower side of tongue, these webs 9 cooperating with two fitting snapping grooves 10.

In front of the snap-together joint, which means the snapping webs 9 and the snapping groove 10, the groove 6 has an entrance opening 8. Inside the snap-together joint the groove 6 continues in a stabilizing groove 13.

The tongue 7 is formed with a rear neck 11 intended to fit in the entrance opening 8 of the groove 6. In front of the snap-together joint the tongue 7 has a forwardly protruding stabilizing part 12 intended for a tight fit in the stabilizing groove 13.

The parts 9 and 10 included in the snap-together joint are also adapted to each other to give a tight fit and strong joint. To increase this effect further the snapping grooves 10 are provided with undercut edges 18 which cooperate with the backside of the snapping webs 9 with the same undercut.

The groove 6 and the tongue 7 are made of thermosetting laminate and formed as a ledge fixed by glue in a recess along the side edges of the panel. The under side 14 of the groove 6 is situated in the same level as the under side 15 of the panel and the under side 16 of the tongue 7 is situated in the same level as the under side 15 of the panel 1.

When connecting panels have been assembled by the snap-together joints and the stabilizing parts 12 inserted in the stabilizing grooves 13, the panels are fixed to each other and prevented from unintentional separation. A rigid floor covering or wall covering with water tight joints and without unintentional gaps between the panels is obtained. The usual rotation of the snapping webs 9 in the snapping grooves 10 is prevented by the stabilizing parts 12 in the stabilizing grooves 13. Accordingly these parts are essential for the possibility to get a rigid joint between the panels.

The embodiment shown in FIG. 3 is very similar to that according to FIG. 2. The difference is that only the under side of the tongue 7 is provided with a snapping web 9. The upper side is lacking a snapping web. Accordingly there is only one snapping groove 10 at the bottom of the groove 6.

The invention is not limited to the embodiments shown since these can be modified in different ways within the scope of the invention.

What is claimed is:

1. A panel designed to be interlocked with another similar panel, said panel comprising two pairs of parallel side edges, two of said side edges being provided with a locking means in the form of a groove and the other two of said side edges being provided with a locking means in the form of a tongue, each said tongue being adapted to be received in a groove of a similar panel; each said groove of said panel comprising at least one first snapping web formed on an upper side of said panel edge and each said groove further comprising at least one second snapping web formed on a lower side of said panel edge and each said groove further comprising a stabilizing groove portion remote from said panel edge; said stabilizing groove portion comprising substantially parallel walls; at least one of said first and said second snapping web defining a depression therein adapted to receive a protrusion on said tongue of a similar panel; each said tongue of said panel extending from said panel edge, each said tongue having distal and proximate ends, said proximate end being adjacent said panel and said distal end being remote therefrom; and at least one protrusion on said tongue intermediate said distal and proximate ends, said protrusion being adapted to be received by said depression defined by at least one of said first and second snapping webs of said similar panel and located intermediate said distal and proximate ends such that when said protrusion is interlocked with said depression on a similar panel, a stabilizing portion of said tongue extends beyond said interlocked protrusion so as to be received by said stabilizing groove portion on said similar panel, said stabilizing portion of said tongue comprising substantially parallel walls, whereby when said panel is interlocked with another similar panel both said tongue stabilizing portion and said at least one protrusion in said panel are fully received within said groove of said similar panel.

2. The panel of claim 1 wherein the panel is formed from a thermosetting laminate.

3. The panel of claim 1 wherein the grooves and tongues are made of water tight materials.

4. The panel of claim 1, wherein each of said first and second snapping webs defines a depression therein and each said tongue has protrusions sized, shaped and located so as to interlock with said depressions.

5. The panel according to claim 1, wherein the stabilizing portion has a width of 2–10 mm.

6. The panel according to claim 1, wherein an underside of the grooves is situated in the same level as an underside of the panel.

7. The panel according to claim 1, wherein an underside of the tongues is situated in the same level as an underside of the panel.

8. The panel of claim 1 wherein the panel is formed of a non-water absorbing base with a surface layer, wherein said surface layer is selected from the group consisting of paint, a thermoplastic foil, a paper sheet impregnated with thermosetting resin, and a thermosetting laminate.

9. The panel of claim 1, wherein two of said side edges of said panel provided with a locking means in the form of a groove are adjacent and the other two of said side edges of said panel being provided with a locking means in the form of a tongue.

10. The panel according to claim 1, wherein said locking means in the form of a tongue are made of a material selected from the group consisting of a thermoplastic, a thermosetting laminate, a chipboard impregnated with a thermoplastic, a particle board impregnated with a thermoplastic, and aluminum.

11. The panel according to claim 1, wherein the panel is formed from a non-water absorbing base with a surface layer, wherein the non-water absorbing base consists of a board produced by pressing thermoplastic impregnated wood particles together to form said non-water absorbing base.

12. The panel according to claim 1, wherein there are two protrusions on each tongue.

13. The panel of claim 1 designed as a flooring panel.

14. A method of covering a floor of a wet room by applying flooring panels according to claim 13 to the floor of said wet room.

15. The panel according to claim 1, wherein said locking means in the form of a groove and said locking means in the form of a tongue are formed as a ledge fixed to the side edges of said panel.

16. The panel according to claim 15, wherein the ledge formed grooves and tongues, respectively, are fixed in a recess along the side edges of the panel.

* * * * *